United States Patent [19]

Chen et al.

[11] Patent Number: 5,895,433
[45] Date of Patent: Apr. 20, 1999

[54] VEHICLE CHASSIS SYSTEM CONTROL METHOD AND APPARATUS

[75] Inventors: Hsien Heng Chen, Troy; Eldon Gerrald Leaphart, Southfield; Edward John Bedner, Brighton; Yuen-Kwok Chin, Troy, all of Mich.

[73] Assignee: General Motors Corporation, Detroit, Mich.

[21] Appl. No.: 08/660,150

[22] Filed: May 23, 1996

[51] Int. Cl.$^6$ ........................................ G06F 7/00
[52] U.S. Cl. ................... 701/41; 701/71; 701/79; 701/90; 303/163; 303/169
[58] Field of Search ........................ 701/1, 41, 70, 701/72, 73, 79, 78, 90, 91, 93, 71, 69; 180/197, 414; 303/121, 146, 163, 169, 173

[56] References Cited

U.S. PATENT DOCUMENTS

| | | | |
|---|---|---|---|
| 4,695,068 | 9/1987 | Kawamoto et al. | 180/409 |
| 5,063,514 | 11/1991 | Headley et al. | 701/73 |
| 5,172,961 | 12/1992 | Inoue et al. | 303/146 |
| 5,315,519 | 5/1994 | Chin et al. | 701/72 |
| 5,341,297 | 8/1994 | Zomotor et al. | 701/72 |
| 5,402,342 | 3/1995 | Ehret et al. | 701/1 |
| 5,444,621 | 8/1995 | Matsunaga et al. | 701/37 |
| 5,465,210 | 11/1995 | Walenty | 701/1 |
| 5,717,591 | 2/1998 | Okada et al. | 180/197 |

FOREIGN PATENT DOCUMENTS

| | | | |
|---|---|---|---|
| 0 555 860 A1 | 8/1993 | European Pat. Off. | |
| 0 557 692 | 9/1993 | European Pat. Off. | B62D 7/15 |
| 0 682 614 | 11/1995 | European Pat. Off. | B60T 8/88 |
| 41 23 235 C1 | 11/1992 | Germany. | |
| 41 21 954 A1 | 1/1993 | Germany. | |
| 42 00 061 A1 | 7/1993 | Germany. | |
| 42 08 000 | 9/1993 | Germany | B60T 8/32 |
| 42 23 385 A1 | 1/1994 | Germany. | |
| 42 29 504 A1 | 3/1994 | Germany. | |
| 43 11 077 A1 | 10/1994 | Germany. | |
| 43 14 827 A1 | 11/1994 | Germany. | |
| 04 135976 | 5/1992 | Japan | B62D 6/00 |
| 05 139327 | 6/1993 | Japan | B62D 6/00 |
| 08 020324 | 1/1996 | Japan | B60T 8/58 |
| 08 040246 | 2/1996 | Japan | B60T 8/88 |
| 2 257 551 | 1/1993 | United Kingdom. | |
| 2 263 340 | 7/1993 | United Kingdom. | |
| 2 269 571 | 2/1994 | United Kingdom. | |
| 2 275 312 | 8/1994 | United Kingdom. | |

OTHER PUBLICATIONS

Control of Vehicle Dynamics, Automotive Engineering, May 1995, pp. 87–93.
Consideration of Lateral & Longitudinal Vehicle Stability by Function Enhanced Brake & Stability Control System, SAE #940832, pp. 63–72.
Spin Control for Cars, Steven Ashley, Associate Editor, Mechanical Engineering Jun., 1995, pp. 66–68.
Automobiles—May the Cornering Force be with You, Popular Mechanics Dec., 1995; pp. 74–77.
The Spin Doctors, Don Sherman; 12PS95 Controlling Vehicle Stability; C.A. Sawyer; Automotive Industries; Jan. 1995; pp. 48 & 50.
Technoid: Intelligent Brakes are on the way; Car and Driver Magazine; Aug. 1994.

*Primary Examiner*—William A. Cuchlinski, Jr.
*Assistant Examiner*—Gertrude Arthur
*Attorney, Agent, or Firm*—Anthony Luke Simon

[57] ABSTRACT

A vehicle chassis system control method, comprising the steps of: measuring vehicle yaw rate, vehicle speed, and vehicle lateral acceleration; determining, responsive to the yaw rate, vehicle speed and lateral acceleration, an index ratio; comparing the index ratio to a predetermined threshold indicating a limit above which active chassis control is not desired; and responsive to the comparison, setting a signal indicating termination of active chassis control if the index ratio is above the predetermined threshold.

11 Claims, 5 Drawing Sheets

VEHICLE CHASSIS SYSTEM CONTROL METHOD AND APPARATUS

This invention relates to a vehicle chassis system control method and apparatus.

BACKGROUND OF THE INVENTION

Some chassis system controls, such as those referred to as active brake controls, are designed to help a vehicle stay on its intended path, that is, to avoid deviation between the direction of vehicle travel and an intended direction defined by a line between either the left front and left rear vehicle wheels or the right front and right rear vehicle wheels.

SUMMARY OF THE PRESENT INVENTION

Advantageously, this invention provides a vehicle chassis system control method and apparatus according to claim 1.

Advantageously, this invention provides a vehicle chassis system control method and apparatus for use with control systems such as active brake controls. Advantageously, this invention determines when a vehicle has deviated too far from its intended course and direction, that is when an angle between the vehicle's actual direction of travel and a direction defined by a line between the front and rear left or right tires, is so large, that the active brake control is ineffective and is preferably switched off.

Advantageously, this invention provides a means for signaling an active brake control mode or other chassis control mode to turn off when deviation from the vehicle intended course and direction is experienced to a sufficient degree to render such control mode ineffective.

Advantageously, according to a preferred example, this invention provides a vehicle chassis system control method, comprising the steps of: measuring vehicle yaw rate, vehicle speed, and vehicle lateral acceleration; determining, responsive to the yaw rate, vehicle speed and lateral acceleration, an index ratio; comparing the index ratio to a predetermined threshold indicating a limit above which active chassis control is not desired; and, responsive to the comparison, setting a signal indicating termination of active chassis control if the index ratio is above the predetermined threshold.

Advantageously, according to another preferred example, this invention provides a vehicle chassis system control apparatus comprising: a set of sensors for measuring and providing signals indicative of vehicle speed, yaw rate and lateral acceleration; a controller, including a microprocessor, receiving the signals and determining an index responsive thereto; a memory for storing the index; and a brake on/off control maintained by the controller, wherein the brake on/off control is switched to an off state when the first index is above a predetermined threshold.

BRIEF DESCRIPTION OF THE DRAWINGS

The present invention will now be described by way of example with reference to the following drawings, in which.

DETAILED DESCRIPTION OF THE INVENTION

Figure 1:
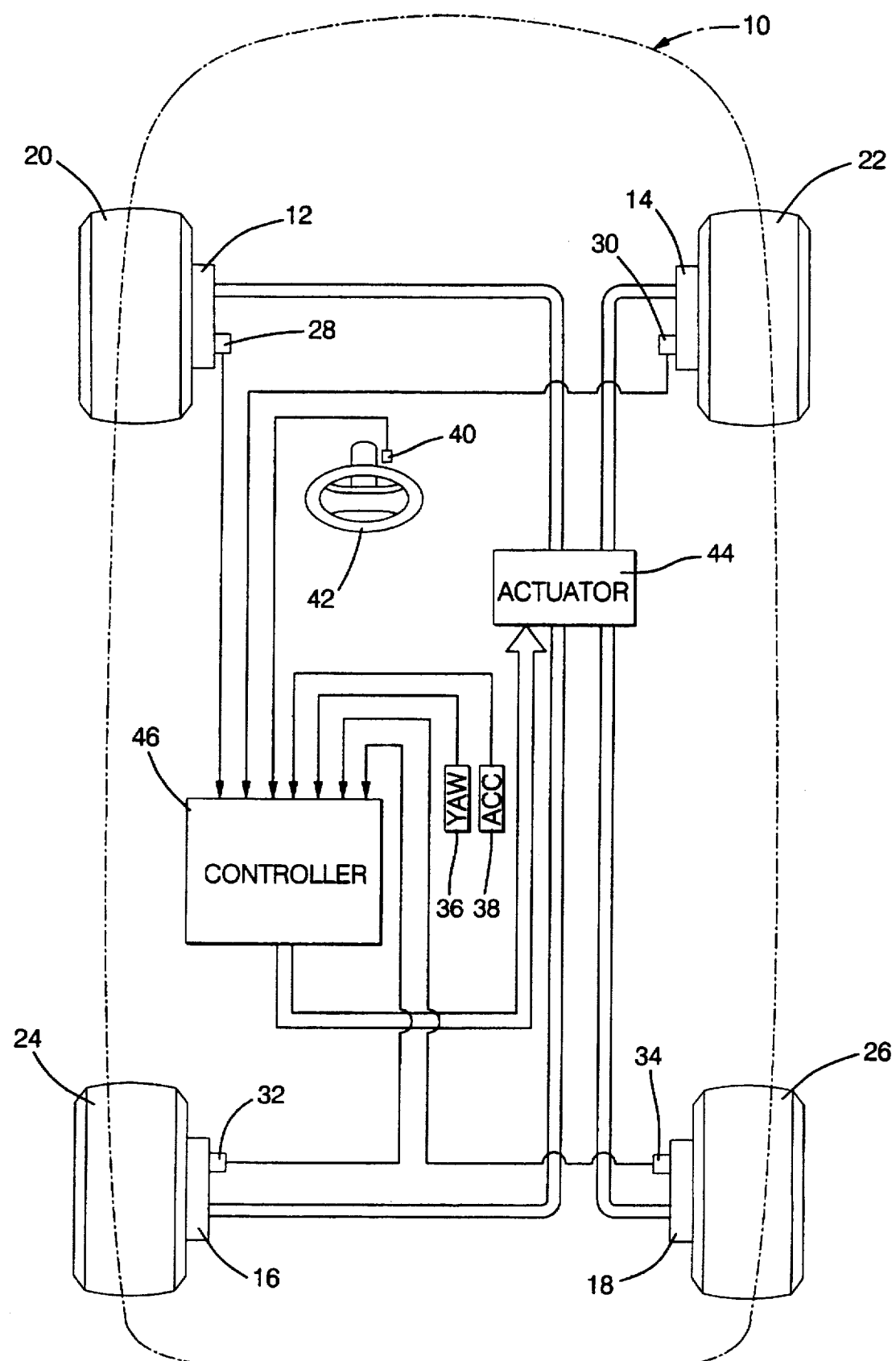
FIG. 1 illustrates a schematic diagram of a vehicle implementing an example apparatus according to this invention.

Referring now to FIG. 1, the vehicle 10 includes four wheels 20, 22, 24 and 26, each with associated wheel brakes 12, 14, 16 and 18. Each wheel 20–26 has a wheel speed sensor 28, 30, 32 and 34 of a known type providing wheel speed information to the microprocessor-based controller 46. The controller 46 also receives steering wheel position information for steering wheel 42 from position sensor 40. Position sensor 40 may be a digital sensor that increments a digital output signal with each degree or partial degree of movement of the steering wheel 42 in one direction and decrements the digital output signal with each degree or partial degree of movement in the opposite direction. The steering wheel sensor 40 need not have an inherent center position signal capability, but such capability may be included to serve as a guide indicating that the steering wheel is approximately on center. Such steering wheel sensors 40 are well known to those skilled in the art.

According to the preferred example, the method described in pending United States patent application, Ser. No. 08/664,321, entitled, "Sensor-Responsive Control Method and Apparatus," assigned to the assignee of this invention, is used by the controller 46 to accurately calibrate the sensor 40 and provide accurate steering wheel sensor information therefrom. The disclosure of the above-mentioned application Ser. No. 08/664,321 is incorporated herein by reference.

In carrying out the advantages provided by this invention, controller 46 also receives signals from yaw rate sensor 36 and lateral accelerometer 38 to effect the controls described herein. The controller 46, in general, controls a brake actuator or actuators 44 for controlling the wheel brakes 12, 14, 16 and 18 to provide any suitable type of chassis control for the vehicle. Various example brake actuators 44 are well known to those skilled in the art and need not be set forth herein in detail.

Because the active brake controls are not germane to this invention and may be any type of control presently known or in the future known to those skilled in the art, further detail of such controls are not set forth herein. Those skilled in the art will recognize that the brake control is considered generic for purposes of this description and the brake control referred to herein may encompass any known brake control.

Figure 2:
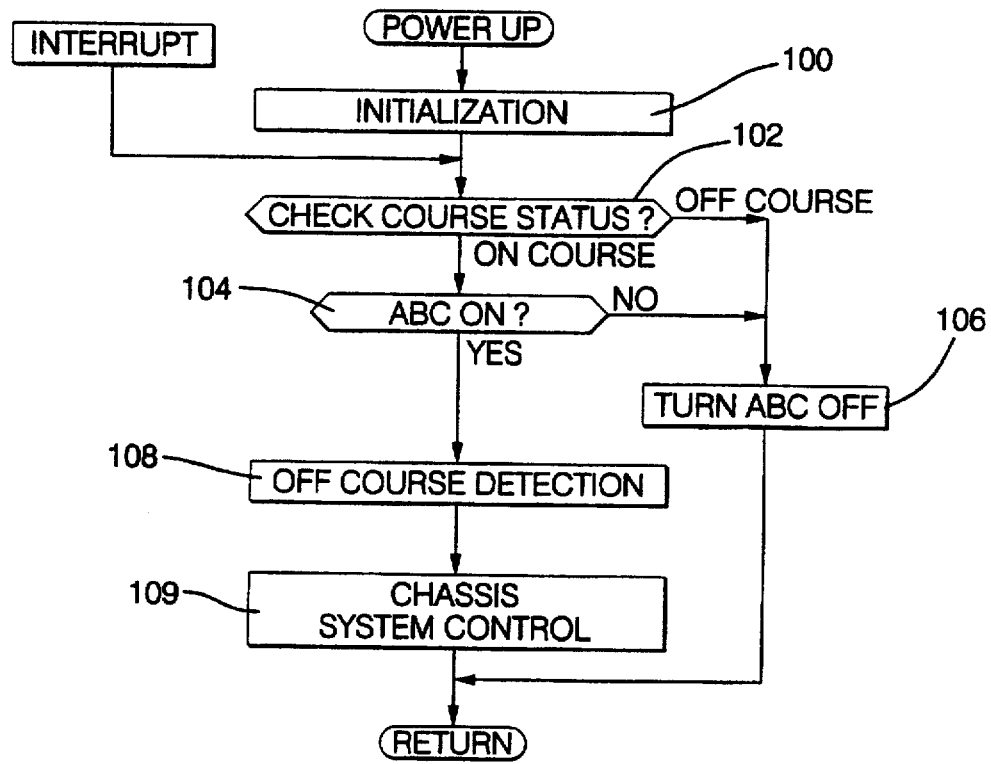
FIG. 2 illustrates a flow diagram for an example computer controller implementation of the apparatus according to this invention.

Referring now to FIG. 2, the main control routine implemented by the brake controller 46 for performing the vehicle chassis system control method according to this invention is shown. The routine is continuously run on an interrupt basis by the controller 46 in conjunction with its other control tasks.

When the vehicle is first powered up, the routine performs the normal initialization tasks (block 100) required by the microprocessor within the controller 46. Then, at block 102, the routine checks a flag indicating whether or not the vehicle is off its course and intended direction.

According to this invention, off course and intended direction means the vehicle is not traveling in a direction and course as normally would be directed by the vehicle tires. That is, there is an angle, referred to as the slip angle, between a line indicating the direction of actual vehicle travel and a line between the front and rear vehicle tires (either left or right). For example, if the vehicle is experiencing rotational moment involving lateral sliding engagement between the vehicle tires and the road surface, then the slip angle is greater than zero. If the slip angle achieves a predetermined level, as further defined below, the condition is detected by this invention and the off course flag is set.

If, at block 102, the off course flag is not set, the routine continues to block 104 where it checks a flag to determine if an advanced chassis control, such as an advanced brake control, is activated. If not, the routine continues to block 106 where the active brake control flag is reset turning off active brake control. If, at block 102, the off course flag is set, the routine continues to block 106 where the active brake control flag is reset.

The active brake control flag that is reset at block 106 is used to control the active brake control in the vehicle. The details of the active brake control or other advanced chassis control suitable for use with this invention are known to those skilled in the art and, because they are not germane to this invention, are not set forth herein in detail. It is understood, however, that the active brake control or other advanced chassis control, such as in four wheel steer system, is responsive to the active brake control flag and is disabled when the active brake control flag is reset at block 106. From block 106, the interrupt routine is terminated.

From block 104, if the active brake control flag indicates that the active brake control is on, the routine continues to block 108 where the off course detection achieved by this invention is implemented as described below. From block 108 the routine continues to block 109 where it implements the chassis system control, such as active brake control, active four wheel steer, etc., in a manner known to those skilled in the art.

Figure 3:
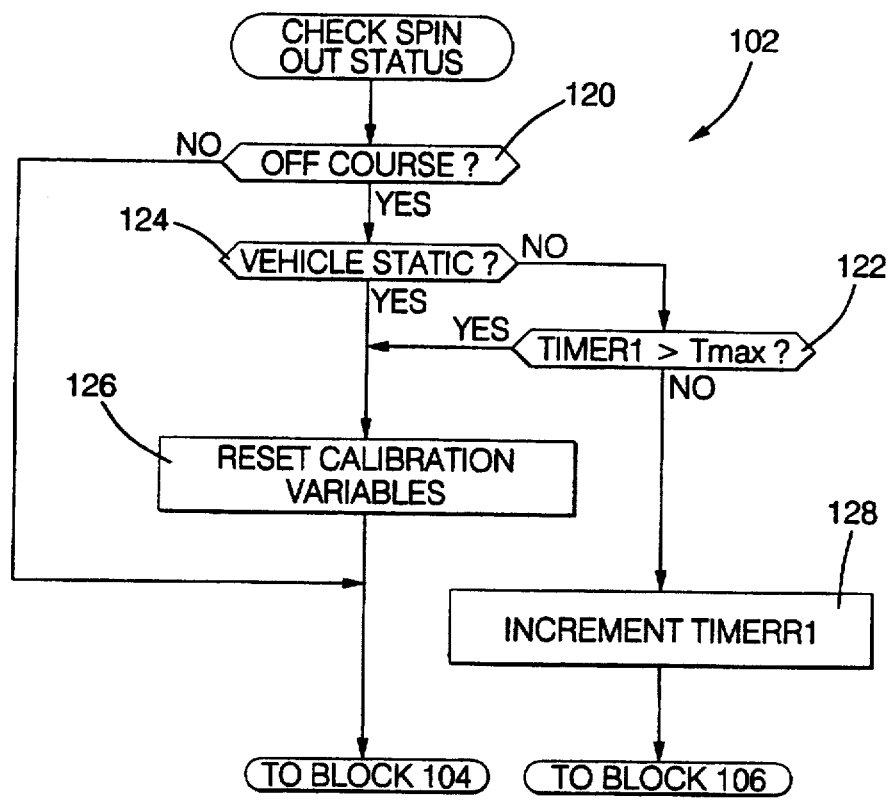
FIGS. 3–8 illustrate example flow subroutines corresponding to the flow diagram shown in FIG. 2.

Referring now to FIG. 3, the test performed at block 102 in FIG. 2 is shown in more detail as the subroutine comprising blocks 120-128. The subroutine starts and moves to block 120 where it checks the off course flag. If the off course flag is not set, the routine exits and moves to block 104 in FIG. 2. If, however, at block 120, the off course flag is set, the routine continues to block 124 where it forms a test to determine whether or not the vehicle is static, i.e., at a stand still or moving very slowly. The test performed at block 124 is shown in more detail as the subroutine 124 in FIG. 4.

Figure 4:
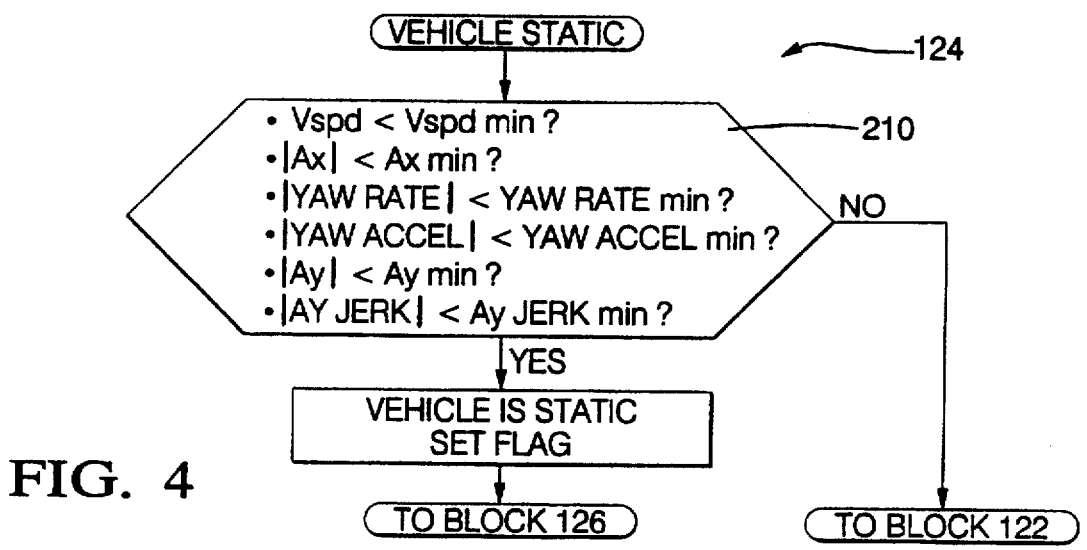

Referring now to FIG. 4, the vehicle static test subroutine starts and moves to block 110 where it checks to determine if all of the following conditions are met: (a) the vehicle speed is below a vehicle speed threshold, for example 8 kph.; (b) the absolute value of the forward acceleration of the vehicle is below an acceleration threshold, for example, 3 m/s$^2$; (c) the yaw rate is below a yaw rate threshold, for example, 1.5 deg./s; (d) the yaw acceleration is below a yaw acceleration threshold, for example 8 deg./s$^2$; (e) the lateral acceleration is below a lateral acceleration threshold, for example 5 m/s$^2$; and (f) the lateral jerk, determined as the integral of lateral acceleration, is below a lateral jerk threshold, for example 0.5 g/s. Vehicle speed is determined either from the vehicle speed signal from the vehicle transmission or as the average of the wheel speeds of the undriven vehicle wheels, i.e., wheels 24 and 26 (FIG. 1) for a front wheel drive vehicle. Forward acceleration is determined either from a forward acceleration sensor or through differentiating the vehicle speed signal. Yaw rate is determined, for example, from the yaw rate sensor, calibration of which may be done in the manner described in the above-mentioned copending application, Ser. No. 08/664, 321. Yaw acceleration is determined by differentiating the yaw rate and lateral acceleration is as measured by the lateral accelerometer.

If all the conditions at block 210 are met, then the routine 124 exits to block 126 (FIG. 3). If any of the conditions at block 210 fail, then the routine 124 exits to block 122 (FIG. 3).

Referring again to FIG. 3, at block 122, the routine compares a timer value TIMER1 to a maximum timer value, TMAX. If the TIMER1 is not greater than TMAX, then the routine continues to block 128 where it increments TIMER1 and then continues to block 106 in FIG. 2. If, however, either of the tests at blocks 124 and 122 are passed, the routine continues to block 126 where all of the off course calibration variables are reset and the subroutine 102 is exited to block 104 in FIG. 2.

The subroutine in block 102, via blocks 122, 124 and 126, resets the off course flag if the vehicle static test is passed at block 124 or if the off course flag has been set for a predetermined time period, after which the control method shown resets the off course flag (block 136) until another off course detection (block 108, FIG. 2) is made.

Figure 5:
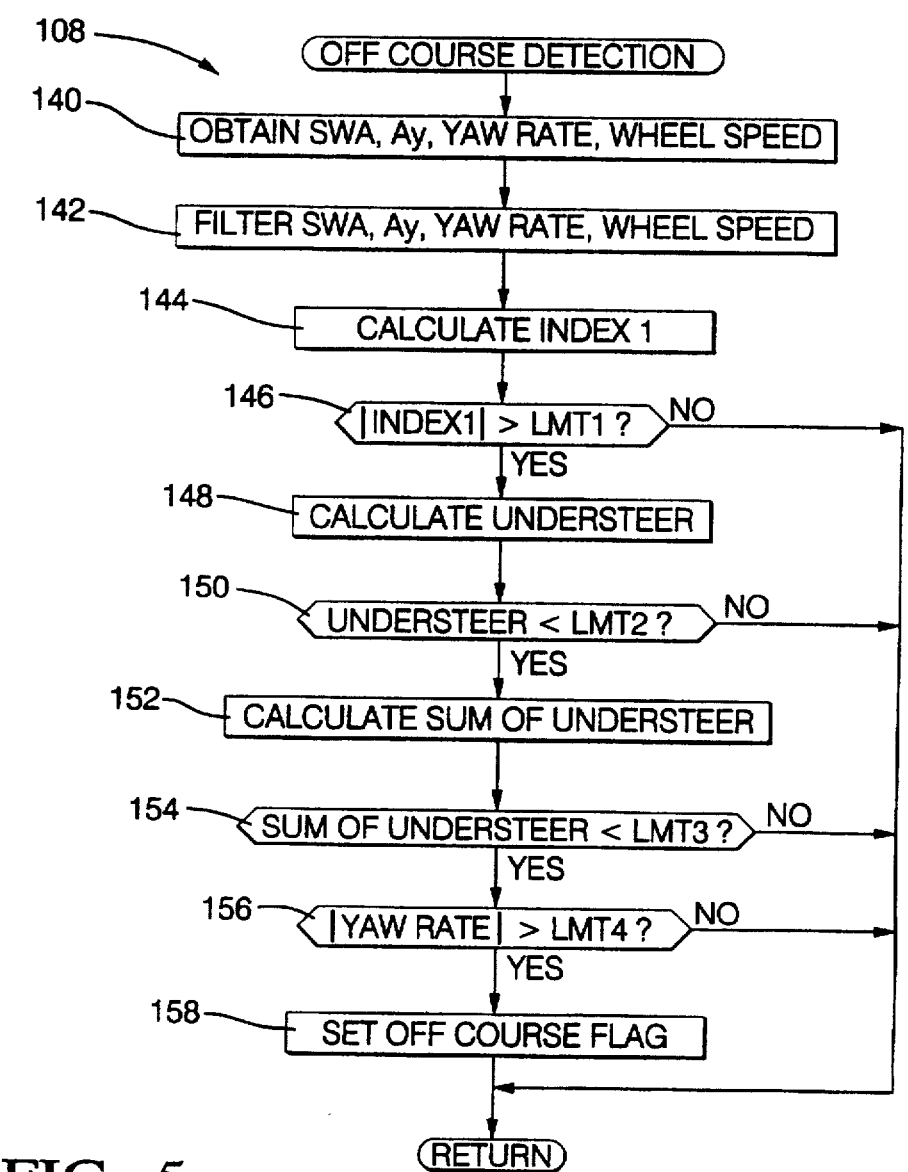

Referring now to FIG. 5, the subroutine for performing the off course detection, block 108 in FIG. 2, is shown in more detail. The off course detection subroutine starts and moves to block 140 where it obtains from the various vehicle sensors measurements of steering wheel angle, lateral acceleration, yaw rate and left and right rear wheel speeds.

At block 142, each of the measurement signals received at block 140 is filtered, for example, through a one pole low pass filter, to eliminate sensor noise and other signal disturbances. From block 142, the routine moves to block 144 where a subroutine calculates an index ratio, also referred to as the stability ratio or stability index, using lateral acceleration, yaw rate and vehicle speed. The index ratio according to this invention is indicative of the vehicle slip angle during certain driving conditions.

Figure 6:
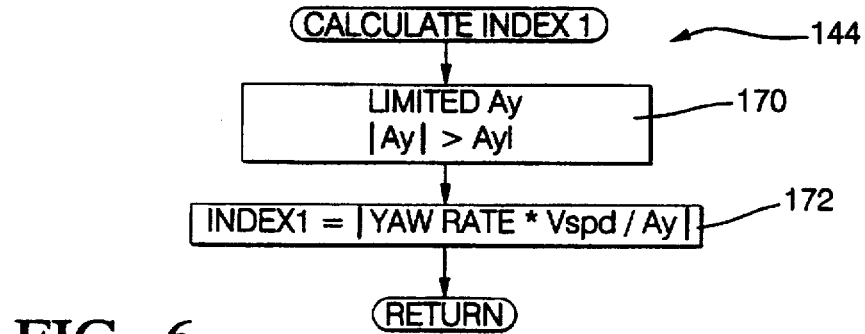

Referring now to FIG. 6, a subroutine 144 for calculating the index ratio is shown. The subroutine 144 starts and moves to block 170 where the absolute value of the lateral acceleration is compared to the lateral acceleration threshold, Ayl. If is greater than the lateral acceleration threshold, then the absolute value of the lateral acceleration is used in determining the index ratio at block 172. If the absolute value of the lateral acceleration is not greater than the lateral acceleration threshold, then the value Ay used for determining the index ratio is set to a predetermined minimum, for example 0.1 g.

At block 172, the index ratio is determined according to:

$$INDEX1 = |YAW\_RATE * v/Ay|,$$

where INDEX1 is the index ratio, YAW_RATE is the yaw rate, v is the vehicle speed and Ay is the lateral acceleration. From block 172 the subroutine in FIG. 6 is exited.

Referring again to FIG. 5, after the calculation of the index ratio at block 144, the routine continues to block 146 where it compares the index ratio to an index ratio threshold, LMT1. An example value for LMT1 is 2. If the index ratio is not greater than LMT1, the routine is exited. If, however, at block 146 the index ratio is greater than LMT1, the first criteria for determining an off course condition is met and the routine continues to block 148 where a subroutine for calculating the understeer index, INDEX2, is performed.

Figure 7:
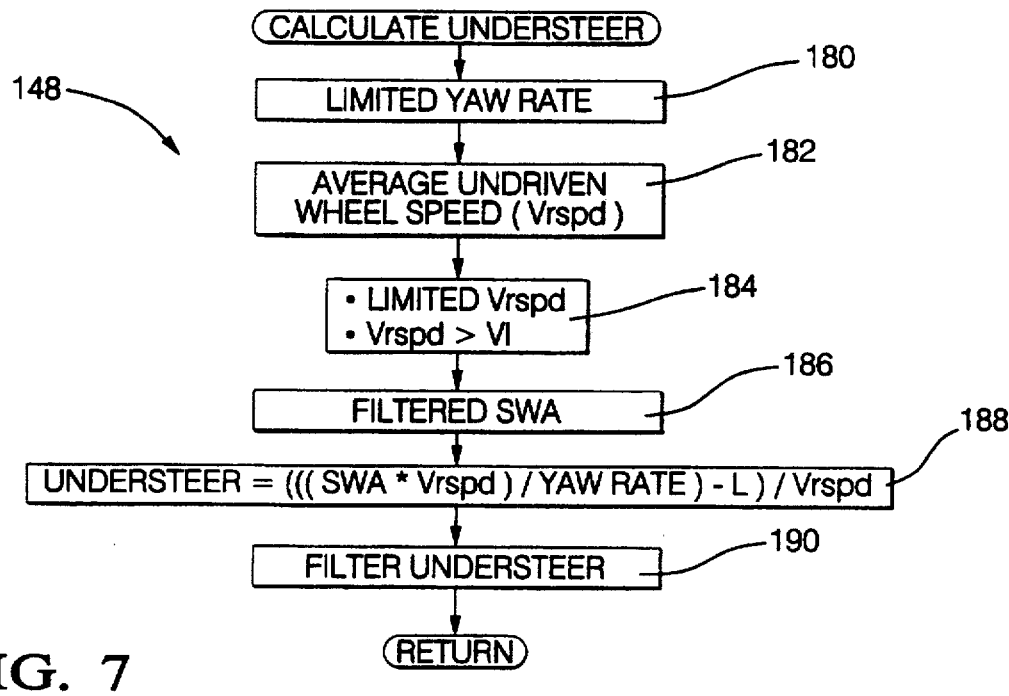

Referring now to FIG. 7, the subroutine for calculating the understeer index 148 begins and moves to block 180 where the measured yaw rate is limited so that it is no greater than a maximum value, YAW1. Then, at block 182, the vehicle speed, v, is computed as the average speed of the two undriven wheels, for example, the left rear and left right wheels in a front wheel drive vehicle. At block 184 the vehicle speed signal is adjusted so that it is no less than the lower limit $V_l$, for example 3 km/h.

The routine moves to block 186 where it filters the steering wheel angle signal to remove noise and signal perturbations therefrom. At block 188 the under steer index is computed as:

$$INDEX2=((\theta*v/YAW\_RATE)-L)/v,$$

where $\theta$ is the steering wheel angle and L is the distance between the front and rear wheels of the vehicle.

The calculated under steer index determined at block 188 is then filtered at block 190 using a simple low pass filter and then the subroutine 148 is exited. It is noted that the under steer index is typically less than zero.

Figure 8:
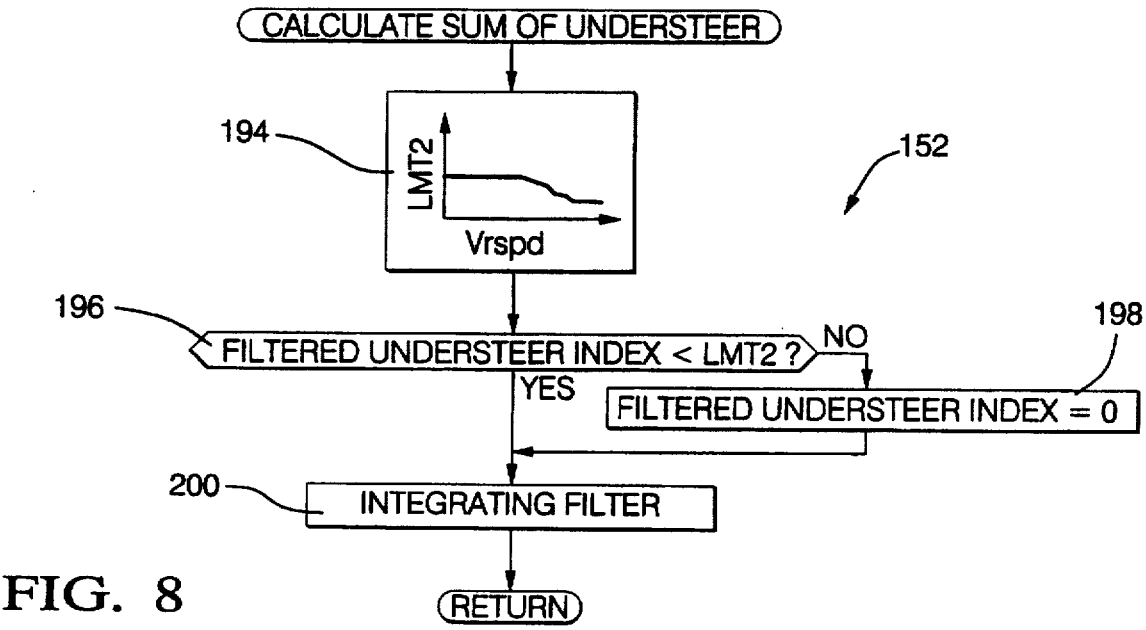

Referring again to FIG. 5, after the understeer index is calculated and filtered by the subroutine shown in FIG. 7, the routine continues to block 150 where it compares the filtered under steer index to a second threshold, LMT2. If the filtered under steer index is greater than LMT2, the routine exits. If, at block 150, the filtered under steer index is less than LMT2, then the second criteria for determining an off course condition of the vehicle is met and the routine continues to block 152 where it performs a subroutine for determining the integral of the under steer index. The subroutine performed at block 152 is shown in FIG. 8, which starts and moves to block 194 where it updates LMT2 from a look-up table based on vehicle speed. The function of the look-up table is shown in block 194. For lower vehicle speeds, LMT2 is set at a fixed value, i.e., −50 but for higher vehicle speeds, LMT2 gradually reduces.

Once the threshold LMT2 is retrieved from the look-up table at block 194, the routine continues to block 196 where it compares the filtered under steer index to LMT2. If the filtered under steer index is not less than LMT2, the routine moves to block 198 where it sets the filtered under steer index to zero and then continues to block 200. If, at block 196, the filtered under steer index is less than LMT2, then the routine continues to block 200.

At block 200 the integral of the filtered under steer index is determined using an integrating filter. An example integrating filter implemented at block 200 is: INT(k)=USI(k) *0.01+INT(k−1), where INT(k) is the filter output and USI is the understeer index. After block 200, the subroutine 152 is exited.

Referring again to FIG. 5, once the subroutine 152 is completed, the routine continues to block 154 where it compares the integral of the filtered under steer index to a third threshold, LMT3. An example value for LMT3 is −150. If the integral of the filtered under steer index is not less than LMT3, the routine is exited. If the integral of the understeer index is less than LMT3, then the third criteria for determining an off course condition of the vehicle is met and the routine continues to block 156 where the last criteria for determining an off course condition of the vehicle is tested.

The test at block 156 compares the absolute value of the yaw rate to the threshold LMT4. An example value for LMT4 is 15 deg/s. If the absolute value of the yaw rate is not greater than LMT4, no off course condition is determined and the routine exits. If, however, the absolute value of yaw rate is greater than LMT4 at block 156, then the fourth and final criteria for determining an off course condition of the vehicle is met and the routine continues to block 158 where it sets the off course flag.

In the example described above, the controller 46 implements a test for determining the condition of a vehicle, whether or not the vehicle is on or off its intended course and direction. The controller sets a control flag for a chassis control system such as an active brake control or a four wheel steer using brake control when an off course state is determined because it is recognized that once a vehicle is off course a predetermined amount, active brake control or other advanced chassis control systems are not implemented in returning the vehicle to course.

Figure 9:
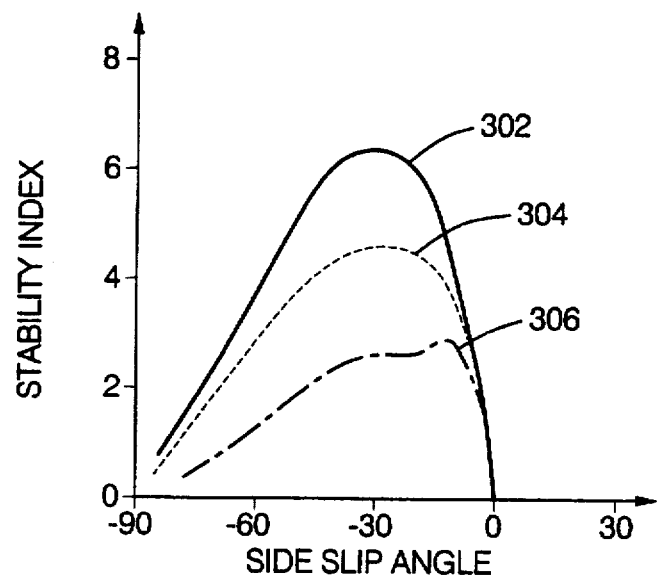
FIG. 9 illustrates an example correlation between the index ratio according to this invention and the side slip angle of a vehicle.

Referring now to FIG. 9, the graph shows the relationship between the index ratio, i.e., computed at block 144 in FIG. 5 and the side slip angle of the vehicle. The side slip angle of the vehicle is defined as the angle between a straight line representing the vehicle's actual direction of travel and a straight line drawn between the vehicle's front and rear left wheels (or front and rear right wheels). The relationship between the index ratio and the side slip angle varies as a function of speed. Trace 302 indicates the relationship for a vehicle traveling at 40 mph, race 304 indicates the relationship for a vehicle traveling at 30 mph and trace 306 indicates the relationship for a vehicle traveling at 20 mph.

Figure 10:
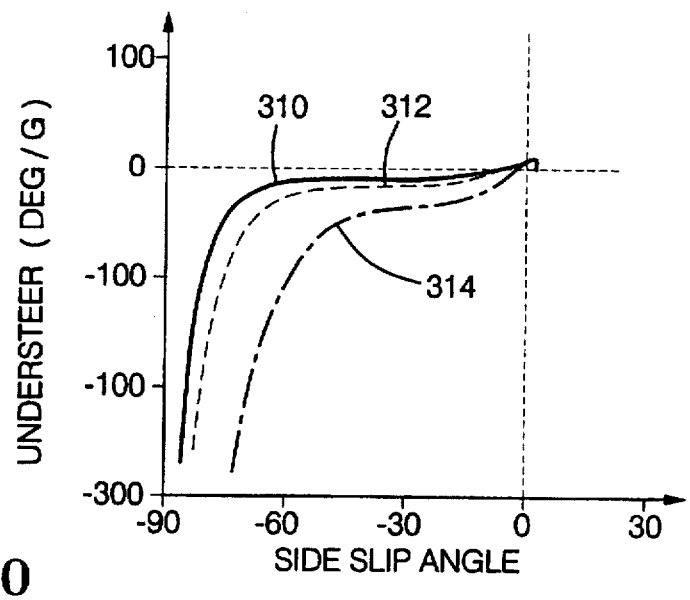
FIG. 10 illustrates an example correlation between computed under steer according to this invention and the side slip angle of a vehicle.

FIG. 10 illustrates the relationship between the under steer index and the side slip angle of the vehicle. Trace 310 illustrates the relationship between the under steer index and the side slip angle for a vehicle traveling at 40 mph, trace 312 illustrates the relationship for a vehicle traveling at 30 mph and trace 314 illustrates the relationship for a vehicle traveling at 20 mph.

Figure 11:
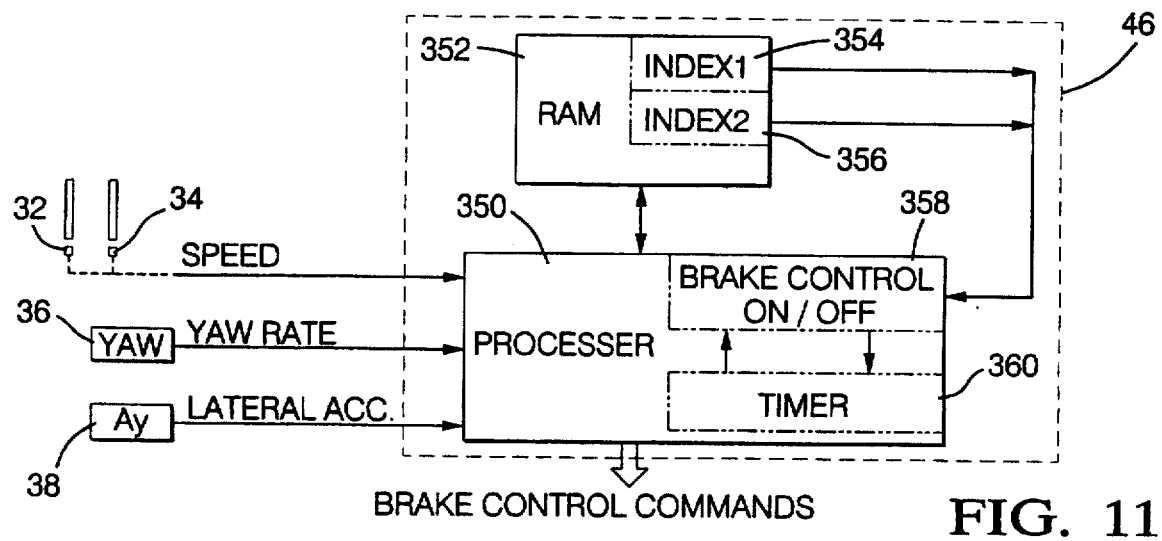
FIG. 11 illustrates a schematic of an example apparatus according to this invention.

Referring now to FIG. 11, the example apparatus schematic of this invention shown includes, within controller 46, internal processor 350, i.e., a microprocessor, and RAM 352. The processor 350 receives the sensor information including the vehicle speed, yaw rate and lateral acceleration as provided by the sensors 32, 34, 36 and 38. Within the controller, sequential operations are performed according to a software control program stored in ROM (not shown) or other non-volatile memory device to effect the steps described above. During operation, the controller 352 computes the indexes, INDEX1 and INDEX2, that are stored in memory locations 354 and 356. The indexes are controls for the active brake control on/off indicator, which, in the example above, is implemented as a flag stored in processor memory or RAM. When the indexes achieve values above predetermined thresholds, the on/off indicator 358 is turned off, disabling active brake control in the processor 350 for a predetermined time period. When indicator 358 is turned off, timer 360 is initiated. When the timer 360 times out, the controller switches the on/off indicator back to the "on" state until the indexes again cause the indicator 358 to be switched off.

We claim:

1. A vehicle chassis system control method, comprising the steps of:

measuring vehicle yaw rate, vehicle speed, and vehicle lateral acceleration;

determining, responsive to the yaw rate, vehicle speed and lateral acceleration, an index ratio indicative of vehicle slip angle;

first comparing the index ratio to a first predetermined threshold indicating a limit above which an active chassis control is not desired;

responsive to the first comparison, setting a signal indicating termination of the active chassis control if the index ratio is above the first predetermined threshold; and terminating the active chassis control responsive to the signal when the index ratio indicates that the vehicle slip angle is so high as to render the active chassis control ineffective.

2. A vehicle chassis system control method according to claim 1, wherein the index ratio represents a ratio of a product of yaw rate and vehicle speed to vehicle lateral acceleration.

3. A vehicle chassis system control method according to claim 1, also comprising the steps of:

measuring steering wheel angle;

determining a second index ratio responsive to the measured steering wheel angle, vehicle speed and yaw rate; and second comparing the second index to a second predetermined threshold, wherein the step of setting the signal is also responsive to the second comparing step.

4. A vehicle chassis system control method according to claim 3, also comprising the step of:

determining the second predetermined threshold as a function of speed.

5. A vehicle chassis system control method according to claim 4, wherein the second predetermined threshold is determined from a look-up table stored in computer memory.

6. A vehicle chassis system control method according to claim 3, also comprising the steps of:

integrating the second index ratio to determine an integration result; and third comparing the integration result to a third predetermined threshold, wherein the step of setting the control signal is also responsive to the third comparison.

7. A vehicle chassis system control method according to claim 6, also comprising the step of fourth comparing an absolute value of the yaw rate to a fourth predetermined threshold, wherein the step of setting the control signal is also responsive to the fourth comparison.

8. A vehicle chassis system control method according to claim 1, also comprising the steps of:

initiating a timer when the signal indicating termination of active chassis control is set; and resetting the signal indicating termination of active chassis control when the timer reaches a time-out value.

9. A vehicle chassis system control apparatus comprising:

a set of sensors for measuring and providing signals indicative of vehicle speed, yaw rate and lateral acceleration;

a controller, including a microprocessor, receiving the signals and determining a first index responsive thereto;

a memory for storing the first index;

a brake control on/off indicator maintained by the controller, wherein the brake control on/off indicator is switched to an off state when the first index is below a predetermined threshold; and a timer, responsive to the brake control on/off indicator, wherein the timer is initiated when the on/off indicator is switched to an off state and wherein the brake control on/off indicator is switched to an on state after the timer reaches a time-out value.

10. A vehicle chassis system control apparatus according to claim 9, wherein the first index represents a ratio of a product of yaw rate and vehicle speed to vehicle lateral acceleration.

11. A vehicle chassis system control apparatus comprising:

at least one actuator for imparting an active chassis control force on a vehicle;

a set of sensors for providing signals indicative of vehicle yaw rate, vehicle speed, and vehicle lateral acceleration;

a controller, including a microprocessor and coupled to the actuator, receiving the signals and determining responsive thereto an index ratio indicative of vehicle slip angle;

a memory for storing the index ratio; and a brake control on/off indicator maintained by the controller and having an on state and an off state, wherein the brake control on/off indicator is switched to the off state when the index ratio is greater than a predetermined threshold indicating a limit above which the active chassis control force is ineffective, wherein the imparting of the active chassis control force on the vehicle by the actuator is terminated when the brake control on/off indicator is switched to the off state.

* * * * *